(12) United States Patent
Sekine et al.

(10) Patent No.: US 7,993,727 B2
(45) Date of Patent: Aug. 9, 2011

(54) ADVANCED GRID STRUCTURE

(75) Inventors: Kazushi Sekine, Tokyo (JP); Hajime Takeya, Tokyo (JP); Tsuyoshi Ozaki, Tokyo (JP); Masami Kume, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 575 days.

(21) Appl. No.: 12/131,455

(22) Filed: Jun. 2, 2008

(65) Prior Publication Data

US 2009/0011175 A1 Jan. 8, 2009

(30) Foreign Application Priority Data

Jul. 6, 2007 (JP) ................................. 2007-178458
Feb. 20, 2008 (JP) ................................. 2008-038787

(51) Int. Cl.
*B32B 5/12* (2006.01)
(52) U.S. Cl. ........ 428/113; 156/290; 428/105; 428/107; 428/109; 428/110; 428/112; 428/114; 428/373; 442/361; 442/363; 442/364
(58) Field of Classification Search .................. 428/105, 428/107, 109, 110, 112–114, 373; 442/361, 442/363, 364; 156/290
See application file for complete search history.

(56) References Cited

U.S. PATENT DOCUMENTS

| | | | | |
|---|---|---|---|---|
| 4,635,071 A * | 1/1987 | Gounder et al. | .............. | 343/897 |
| 5,686,930 A * | 11/1997 | Brydon | ......................... | 343/912 |
| 6,270,426 B1 * | 8/2001 | Matsumoto | ................... | 473/319 |
| 7,479,201 B1 * | 1/2009 | Wegner et al. | ................ | 156/242 |
| 2004/0213952 A1* | 10/2004 | Takemura et al. | ............ | 428/105 |
| 2008/0045109 A1* | 2/2008 | Ogata et al. | ............... | 442/364 |

OTHER PUBLICATIONS

K. Joon Yoon, et al., "Composite Grid Structure With Near-Zero Thermally Induced Deflection", $41^{st}$ AIAA/ASME/ASCE/AHS/ASC Structures, Structural Dynamics, and Materials Conference and Exhibit, Apr. 2000, pp. 971-976.

* cited by examiner

*Primary Examiner* — Brent T O'Hern
(74) *Attorney, Agent, or Firm* — Oblon, Spivak, McClelland, Maier & Neustadt, L.L.P.

(57) ABSTRACT

An advanced grid structure has high strength and low thermal expansion, and includes first, second, and third tape prepreg groups each including a plurality of tape prepregs. Each tape prepreg includes carbon fibers that are aligned in a first, second, or third direction and that form respective first, second, and third grid sides. A plurality of each the first, second, and third grid sides are spaced apart at equal intervals in the respective first, second, or third direction to form respective first, second, and third grid side groups. A structure ratio of the advanced grid structure is larger than 0 and 0.107 or less, 0.053 or less, or 0.040 or less. A thermal expansion coefficient of the advanced grid structure is −0.9 ppm/K or more and 0.9 ppm/K or less. The carbon fibers have a tensile modulus of elasticity of 280 GPa or more and 330 GPa or less.

6 Claims, 9 Drawing Sheets

(a)

(b)

(a)

(b)

(c)

(a)

(b)

(c)

ADVANCED GRID STRUCTURE

BACKGROUND OF THE INVENTION

1. Field of the Invention

The present invention relates to an advanced grid structure which has high strength and low thermal expansion characteristics, and which is formed by using carbon fiber reinforced plastic that is a material for use in the aerospace which is lighter than metal and has a low thermal expansion coefficient.

2. Description of the Related Art

In recent years, along with increase in demand for high resolution images of the Earth's surface, there is made a plan to arrange a plurality of small satellites incorporating optical devices in the low earth orbit. Accordingly, an importance is put on development of the small satellites incorporating the optical devices. In order to prevent reduction in observation accuracy of the optical devices, there is a demand for each of the satellites to have a satellite structure having thermal dimensional stability. Further, unlike medium and large satellite structures which need to have high rigidity, the small satellite structures need to have high strength.

As the satellite structure having thermal dimensional stability, there is suggested a low thermal expansion structure having a complex quadrangular lattice. The low thermal expansion structure of the complex quadrangular lattice is obtained by combining quadrangular tubes and rods having slots. The quadrangular tubes are formed by utilizing characteristics differing in thermal expansion coefficient between a direction in which carbon fibers of the carbon fiber reinforced plastic run and a direction perpendicular to the direction in which the carbon fibers run, and by adjusting an orientation angle of the carbon fibers so that the thermal expansion coefficient becomes close to zero. Further, the rods include first rods made of the carbon fiber reinforced plastic and second rods made of the carbon fiber reinforced plastic. Slits are provided to those in positions which fit with each other. The low thermal expansion structure is assembled by arranging the first rods and the second rods perpendicularly to each other and fitting those by the slits and is structured by fitting the quadrangular tubes to an inner side surrounded by side surfaces of the rods. With this structure, a structure having a value of the thermal expansion coefficient close to zero is realized (see, for example, authors, K. J. Yoon and three others "COMPOSITE GRID STRUCTURE WITH NEAR-ZERO THERMALLY INDUCED DEFLECTION", 41st AIAA/ASME/ASCE/AHS/ASC Structures, Structural Dynamics, and Materials Conference and Exhibit, April 2000, AIAA-200-1476, pp. 971-976).

However, in the above-mentioned low thermal expansion structure, while the thermal expansion coefficient can be set within a range from −1.0 ppm/K to 1.0 ppm/K, the rods are fitted and adhered to each other through the slits. Accordingly, there is a problem in that strength of the low thermal expansion structure is limited due to a low tensile strength of about 40 MPa at the adhesion portions, so the strength is reduced.

In this case, when a conventional pseudoisotropic laminated structure is structured by using carbon fibers having a tensile modulus of elasticity of 280 GPa or more and 330 GPa or less, it is possible to realize the pseudoisotropic laminated structure having high strength, whose tensile strength is 4600 MPa or more, but whose thermal expansion coefficient is 1.1 ppm/K or more.

In general, carbon fibers have a negative thermal expansion coefficient, and a resin has a positive thermal expansion coefficient. Accordingly, while the carbon fiber reinforced plastic having a one-direction laminated structure of the carbon fibers has the negative thermal expansion coefficient in a direction of the carbon fibers, the pseudoisotropic laminated structure formed thereby has the positive thermal expansion coefficient.

Further, the modulus of elasticity and the thermal expansion coefficient of the carbon fibers have an inverse proportional relationship, and the modulus of elasticity and the strength thereof also have an inverse proportional relationship. As a result, the strength and the thermal expansion coefficient of the carbon fibers have a proportional relationship. Accordingly, in the pseudoisotropic laminated structure formed by using the carbon fibers having high strength, a thermal expansion coefficient cannot be made close to zero. Therefore, there is a problem in that this pseudoisotropic laminated structure is not appropriate for the satellite structure incorporating optical devices in terms of the thermal dimensional stability.

Further, conventional earth observatory satellites have medium or large sizes, so there are needs for satellite structures having high rigidity and low thermal expansion characteristics. Accordingly, there is not reached an object of developing a satellite structure having high strength and low thermal expansion characteristics.

SUMMARY OF THE INVENTION

It is an object of the present invention to provide an advanced grid structure having high strength and low thermal expansion characteristics.

According to the present invention, there is provided an advanced grid structure including:

a first tape prepreg group in which carbon fibers, which are arranged at equal intervals in a first direction, are oriented in a longitudinal direction of the carbon fibers;

a second tape prepreg group in which carbon fibers, which are arranged at equal intervals in a second direction inclined counterclockwise at 60 degrees with respect to the first direction, are oriented in a longitudinal direction of the carbon fibers;

a third tape prepreg group in which carbon fibers, which are arranged at equal intervals in a third direction inclined clockwise at 60 degrees with respect to the first direction, are oriented in a longitudinal direction of the carbon fibers, the first tape prepreg group, the second tape prepreg group, and the third tape prepreg group being laminated repetitively in the stated order so that two of the first tape prepreg group, the second tape prepreg group, and the third tape prepreg group overlap each other, and being heated under pressure, to thereby form the advanced grid structure;

a first grid side group extending in the same direction as the first tape prepreg group and constituting a side of a grid group;

a second grid side group extending in the same direction as the second tape prepreg group and constituting a side of the grid group; and a third grid side group extending in the same direction as the third tape prepreg group and constituting a side of the grid group, in which:

a structure ratio of the advanced grid structure is larger than 0 and 0.107or less, the structure ratio being obtained by dividing a grid side width by an interval between a center point of a region where the second grid side group and the third grid side group cross each other and a center of a region which is closest to the region where the second grid side group and the third grid side group cross each other, and where the second grid side group and the third grid side group cross each other; and the carbon fibers have a tensile modulus of elasticity of 280 GPa or more and 330 GPa or less.

The advanced grid structure according to the present invention includes the three grid side groups each having grid sides arranged at equal intervals in which carbon fibers are oriented in one direction. Of the three grid side groups, the first grid side group is used as a reference, and the remaining second grid side group and third grid side group are inclined clockwise and counterclockwise at 60 degrees, respectively. The three grid side groups cross each other. Accordingly, the resultant includes one-direction laminated portions of the carbon fibers, in which the grid sides do not cross each other, and crossing region portions where the grid side groups cross each other. The crossing region portions of the grid side groups have characteristics close to that of the pseudoisotropic laminated structure. As a ratio of the grid groups of equilateral triangles increases, the characteristics of the grid structure become closer to the characteristics of the pseudoisotropic laminated structure, thereby exhibiting an effect of having high strength and low thermal expansion characteristics.

DETAILED DESCRIPTION OF THE PREFERRED EMBODIMENTS

First Embodiment

Figure 1:
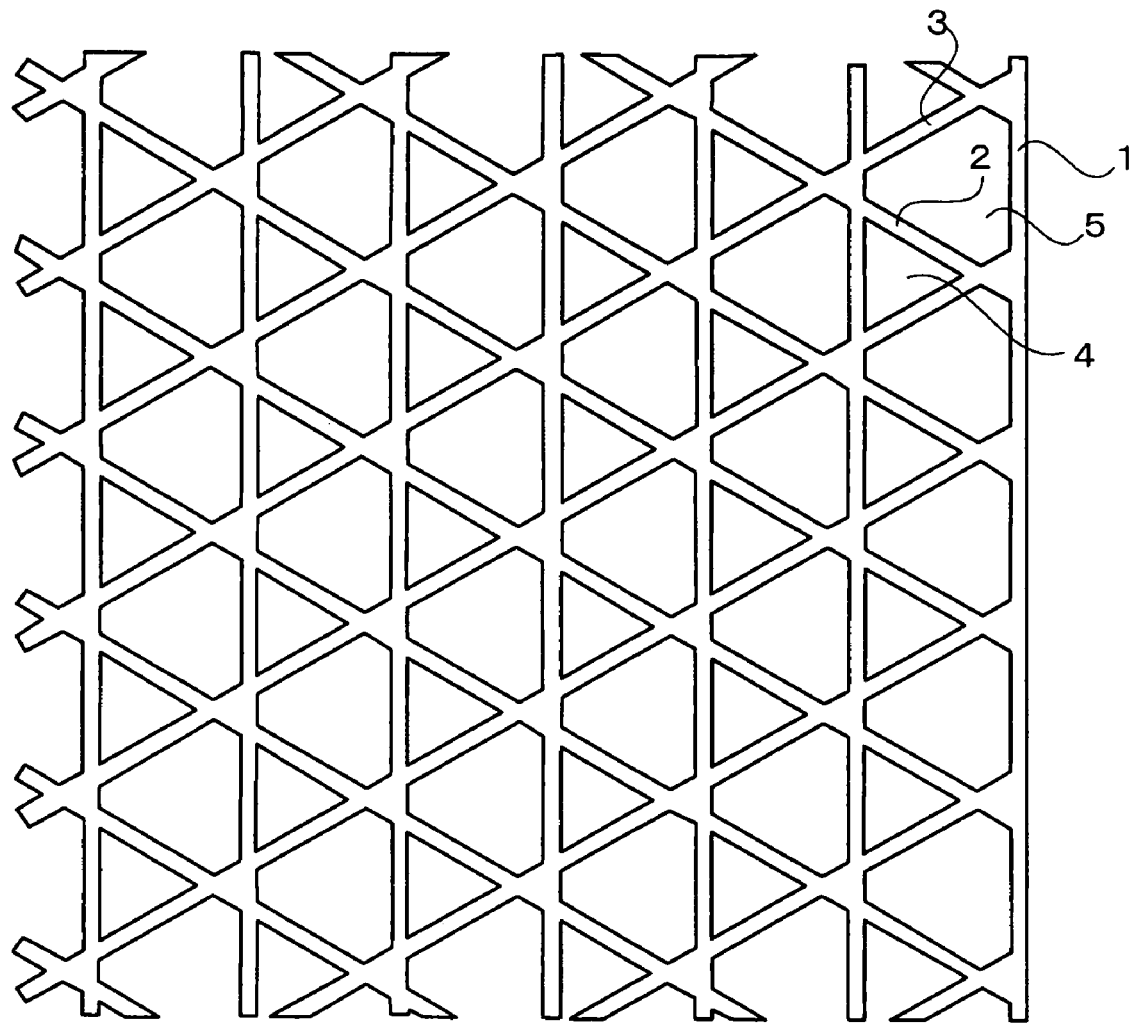
FIG. 1 is a front view of an example of an advanced grid structure according to a first embodiment of the present invention.
Figure 2:
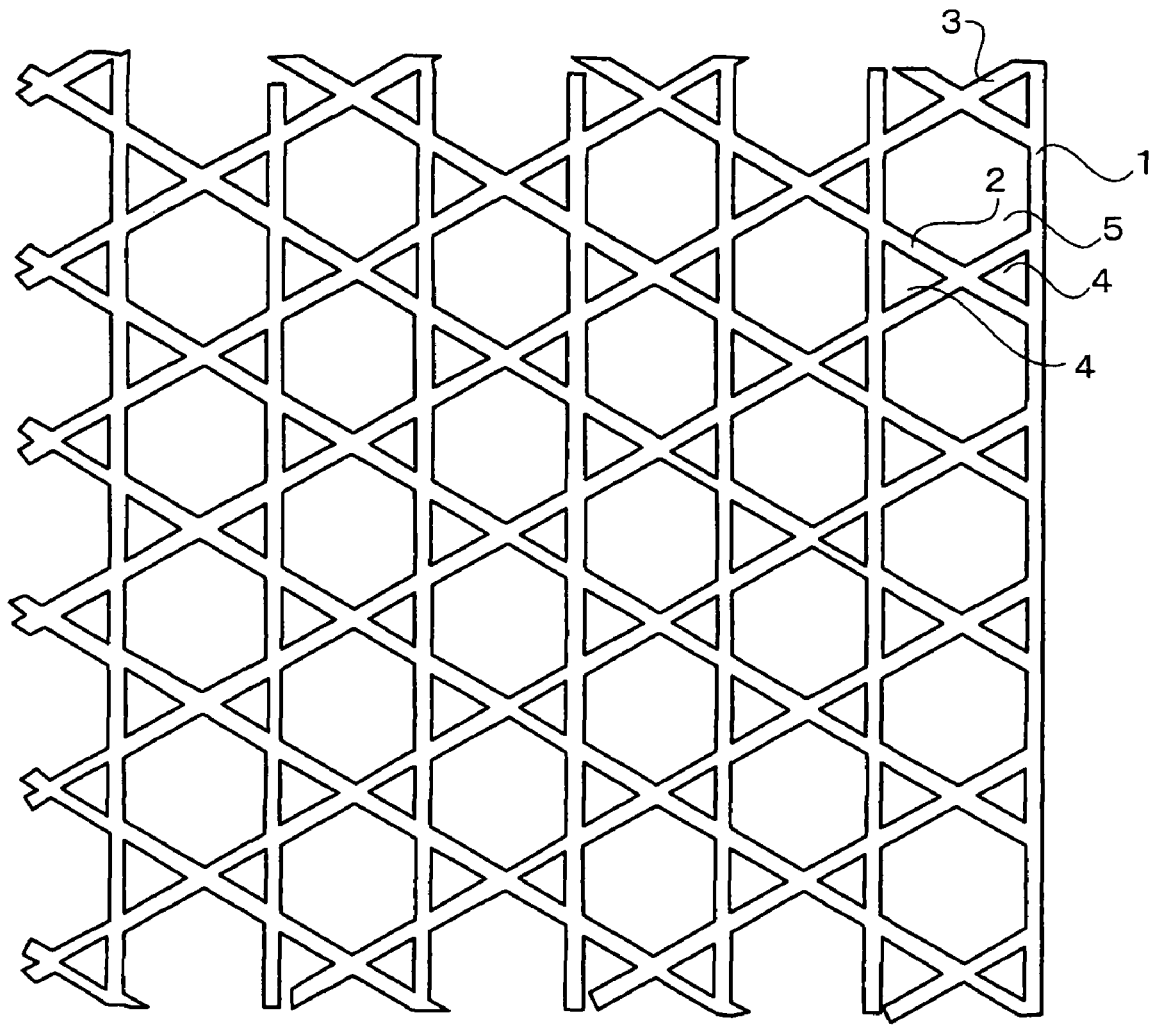
FIG. 2 is a front view of another example of the advanced grid structure according to the first embodiment of the present invention.

FIG. 1 is a front view of an example of an advanced grid structure according to a first embodiment of the present invention. FIG. 2 is a front view of another example of the advanced grid structure according to the first embodiment of the present invention.

For the advanced grid structure according to the first embodiment of the present invention, there are used prepregs formed by impregnating a resin into carbon fibers and semi-curing the resultant. Belt-like tape prepregs including prepregs formed of a carbon fiber reinforced epoxy resin in which carbon fibers are oriented in a longitudinal direction thereof are laminated to be heated under pressure, thereby being formed into a truss structure. As the carbon fibers, there are used TORAYCA (registered trademark) carbon fibers T800HB manufactured by Toray Industries Inc. having high strength and a tensile modulus of elasticity of 280 GPa or more and 330 GPa or less.

Terms used in the following description are described.

A term "grid side" described later means each of components constituting sides of an equilateral-triangular grid and a hexagonal grid provided to the advanced grid structure.

A term "tape prepreg" is a tape-like member in a semi-cured state, which is manufactured by impregnating a resin into a plurality of integrated carbon fibers.

The advanced grid structure according to the first embodiment of the present invention, whose longitudinal direction is a vertical direction on a plane of FIGS. 1 and 2, includes a plurality of grid sides (hereinafter, referred to as "0-degree direction grid side") 1 which are arranged in parallel to each other at equal intervals in a first direction perpendicular to the longitudinal direction, a plurality of grid sides (hereinafter, referred to as "+60-degree direction grid side") 2 which cross the 0-degree direction grid sides 1 by being inclined counter-clockwise at 60 degrees and which are arranged in parallel to each other at equal intervals, and a plurality of grid sides (hereinafter, referred to as "−60-degree direction grid side") 3 which cross the 0-degree direction grid sides 1 by being inclined clockwise at 60 degrees and which are arranged in parallel to each other at equal intervals. Note that the plurality of 0-degree direction grid sides 1 are referred to as a first grid side group, the plurality of +60-degree direction grid sides 2 are referred to as a second grid side group, and the plurality of −60-degree direction grid sides 3 are referred to as a third grid side group.

In the advanced grid structure according to the first embodiment of the present invention, the 0-degree direction grid sides 1, the +60-degree direction grid sides 2, and the −60-degree direction grid sides 3 form equilateral-triangular grids 4 and hexagonal grids 5.

Figure 3:
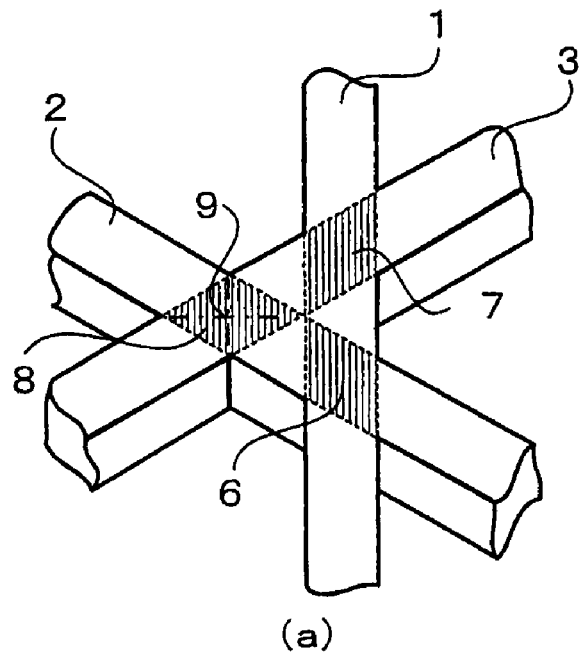
FIG. 3 are enlarged views each including a joint point of the advanced grid structure according to the first embodiment of the present invention.
Figure 3:
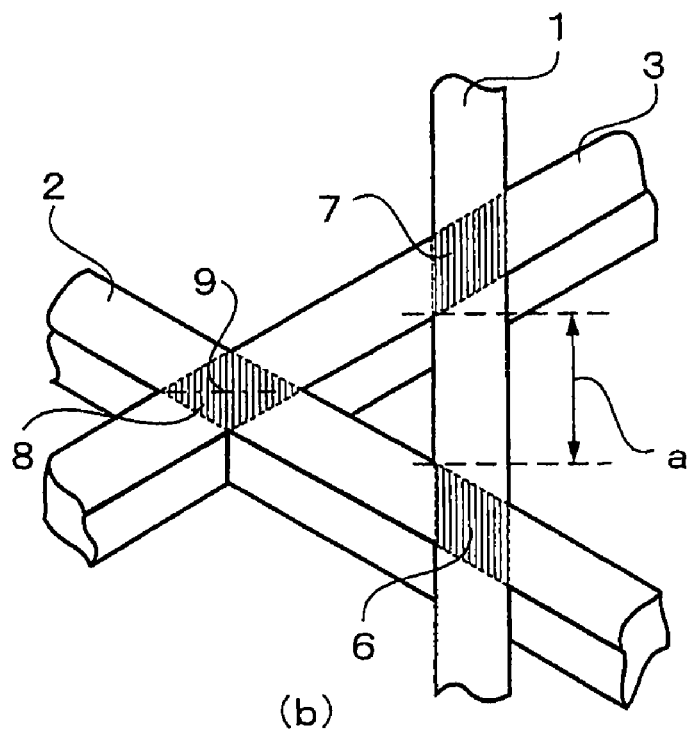

FIG. 3 are enlarged views each including a joint point of the advanced grid structure according to the first embodiment of the present invention. The enlarged view of FIG. 3A illustrates a case where a distance between crossing regions of the grid side groups is zero as in the case of the advanced grid structure of FIG. 1. The enlarged view of FIG. 3B illustrates a case where the distance between the crossing regions of the grid side groups is not zero as in the case of the advanced grid structure of FIG. 2.

The 0-degree direction grid side 1 crosses, as illustrated in FIG. 3, the +60-degree direction grid side 2 and the −60-degree direction grid side 3 in a first crossing region 6 and a second crossing region 7, respectively. The +60-degree direction grid side 2 crosses the −60-degree direction grid side 3 in a third crossing region 8. It is found that when the first crossing region 6, the second crossing region 7, and the third crossing region 8 exist in the vicinity of each other, those regions have characteristics close to that of a pseudoisotropic laminated structure. Note that the third crossing region 8 has a rhombic shape and a center point at which two diagonal lines of the rhomboid cross each other is referred to as a joint point 9.

Further, it is found that, with the crossing regions 6, 7, and 8 being spaced apart by a distance a so as not to be brought into contact with each other, when a ratio of an equilateral-triangular grid group contained in the grid structure is increased, the grid structure has characteristics close to that of the pseudoisotropic laminated structure. Note that, in this case, a maximum value of the distance a between the crossing regions 6 and 7 is half the distance between the joint points 9.

Figure 4:
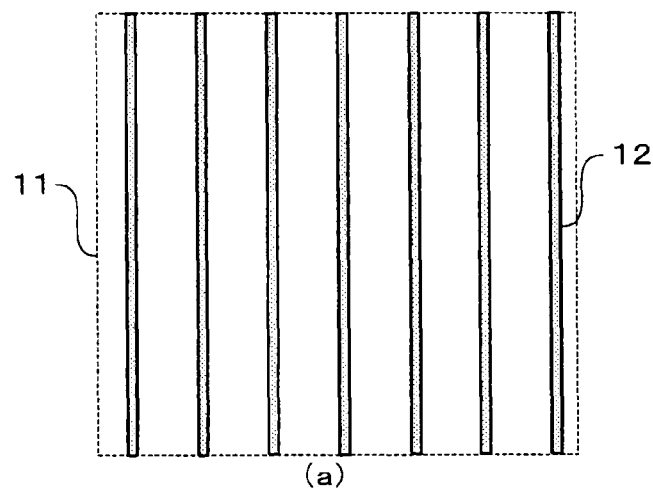
FIG. 4 are plan views illustrating carbon fiber tape prepregs of three types for manufacturing the advanced grid structure according to the first embodiment of the present invention.
Figure 4:
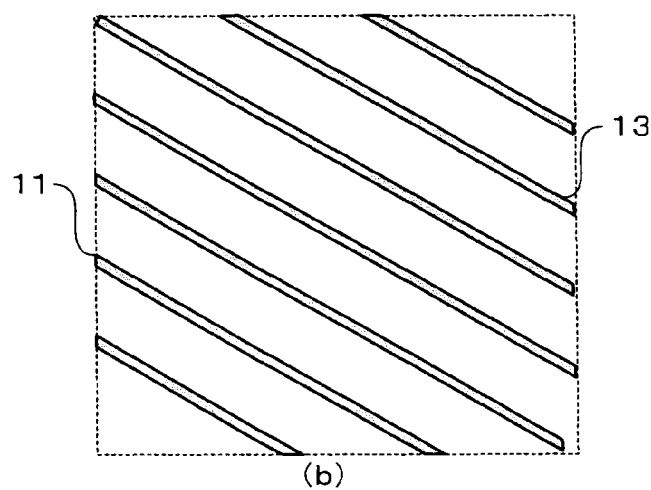
Figure 4:
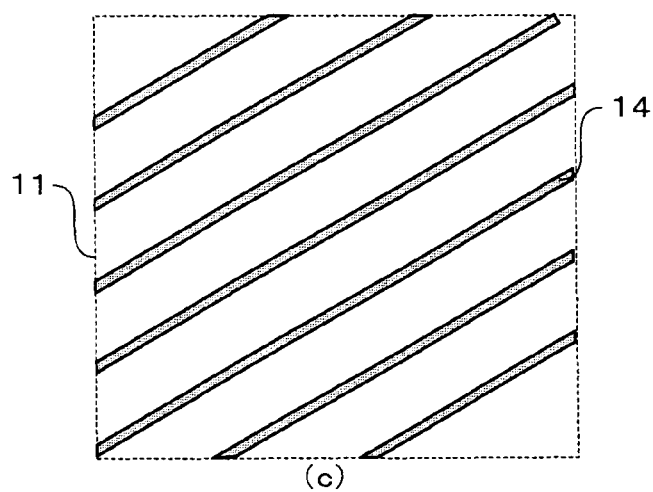

Next, a description is made of a method of manufacturing the advanced grid structure according to the first embodiment of the present invention. FIG. 4 are plan views of tape prepregs for manufacturing the advanced grid structure according to the first embodiment of the present invention.

By using TORAYCA (registered trademark) carbon fibers T800HB manufactured by Toray Industries Inc. having a tensile modulus of elasticity of 280 GPa or more and 330 GPa or less and an epoxy resin material, belt-like tape prepregs in which carbon fibers are oriented in the longitudinal direction (vertical direction of plane of FIG. 4A) are prepared. A 0-degree direction carbon fiber tape prepreg 12 in which the carbon fibers are oriented in parallel to a reference side 11 as illustrated in FIG. 4A, a +60-degree direction carbon fiber prepreg 13 in which the carbon fibers are oriented so as to be inclined counterclockwise at 60 degrees with respect to the reference side 11 as illustrated in FIG. 4B, and a −60-degree direction carbon fiber prepreg 14 in which the carbon fibers are oriented so as to be inclined clockwise at 60 degrees with respect to the reference side 11 as illustrated in FIG. 4C are laminated in the stated order for a plurality of times. The resultant is heated under pressure, thereby manufacturing the advanced grid structure according to the first embodiment of the present invention illustrated in FIGS. 1 or 2.

Note that the plurality of 0-degree direction carbon fiber tape prepregs 12 arranged are referred to as a first tape prepreg group, the plurality of +60-degree direction carbon fiber prepregs 13 arranged are referred to as a second tape prepreg group, and the plurality of −60-degree direction carbon fiber prepregs 14 arranged are referred to as a third tape prepreg group.

In this case, it is found that, when, of the first grid side group extending in the same direction as the first tape prepreg group and constituting a side of a grid group, the second grid side group extending in the same direction as the second tape prepreg group and constituting a side of the grid group, and the third grid side group extending in the same direction as the third tape prepreg group and constituting a side of the grid group, regions where the first grid side group, the second grid side group, and the third grid side group cross each other exist in the vicinity of each other, the regions have characteristics close to that of the pseudoisotropic laminated structure.

Further, it is found that, in the grid structure including the equilateral-triangular grid group and the hexagonal grid group, when the distance between the regions where the grid side groups cross each other is made larger to increase a ratio of the equilateral-triangular grid group included in the grid structure, the grid structure has characteristics close to that of the pseudoisotropic laminated structure.

Figure 5:
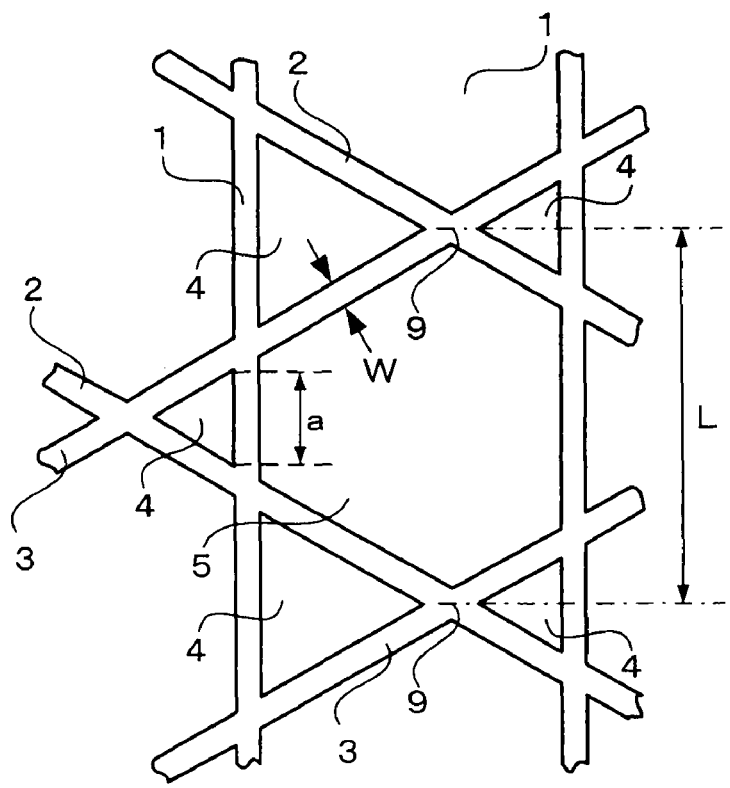
FIG. 5 is an enlarged view including equilateral-triangular grids and a hexagonal grid of the advanced grid structure according to the first embodiment of the present invention.

FIG. 5 is an enlarged view including the equilateral-triangular grids 4 and the hexagonal grid 5 of the advanced grid structure according to the first embodiment of the present invention.

In this case, two factors indicating a structure of the advanced grid structure including the equilateral-triangular grids 4 and the hexagonal grids 5 are introduced to determine a relationship between the factors and a thermal expansion coefficient of the advanced grid structure.

One of the factors to be introduced is a quotient obtained by dividing a width W of the grid side by a distance L between the joint points 9. The quotient is referred to as a structure ratio. The other of the factors to be introduced is a distance a between the crossing regions where the grid sides cross each other. Note that, in this case, the distance a is 0 or more and L/2 or less.

Next, a description is made of measurement of the thermal expansion coefficient of the advanced grid structure.

In the measurement of the thermal expansion coefficient of the advanced grid structure, first, the advanced grid structure which is a measurement sample 15 is placed on a sample support base 16 to be fixed to an inside of a constant temperature oven 17. Next, with a temperature in the constant temperature oven 17 being controlled to change a temperature of the measurement sample 15, laser is applied from laser focus displacement meters 19 to laser reflection mirrors 18 adhered to both ends of the measurement sample 15, and reflected light is received to measure a displacement amount of the measurement sample 15 by heating, thereby calculating the thermal expansion coefficient.

The distance L between the joint points 9 of the advanced grid structure according to the first embodiment of the present invention is 105 mm and a width W of the grid side is 1.60 mm, so the structure ratio is 1.60/105=0.015. Further, the distance a between the crossing regions where the grid sides cross each other is 0 mm.

At this time, the measured thermal expansion coefficient is −0.20 ppm/K.

Figure 6:
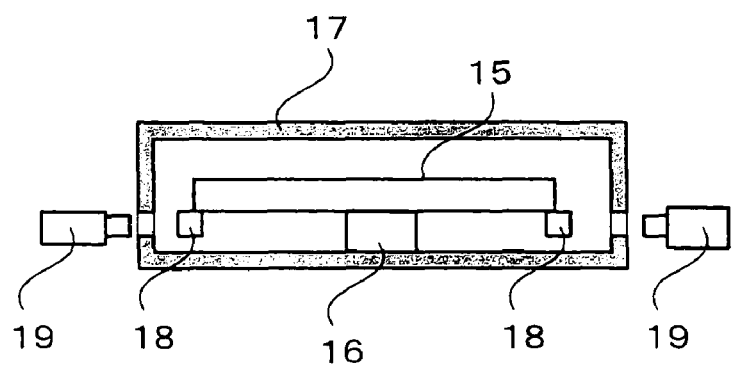
FIG. 6 is a sectional view illustrating a measuring device for a thermal expansion coefficient of the advanced grid structure according to the first embodiment of the present invention.

Next, the tape prepregs were prepared such that the distances L between the joint points 9 were different from each other, and the advanced grid structure was manufactured thereby. In this case, the structure ratios were 1.60/105=0.015, 1.60/52.5=0.030, 1.60/26.25=0.060, and 1.60/14.953=0.107. The distances a between the regions were 0 mm and 24 mm. The thermal expansion coefficient of the advanced grid structure was measured as illustrated in FIG. 6.

Figure 7:
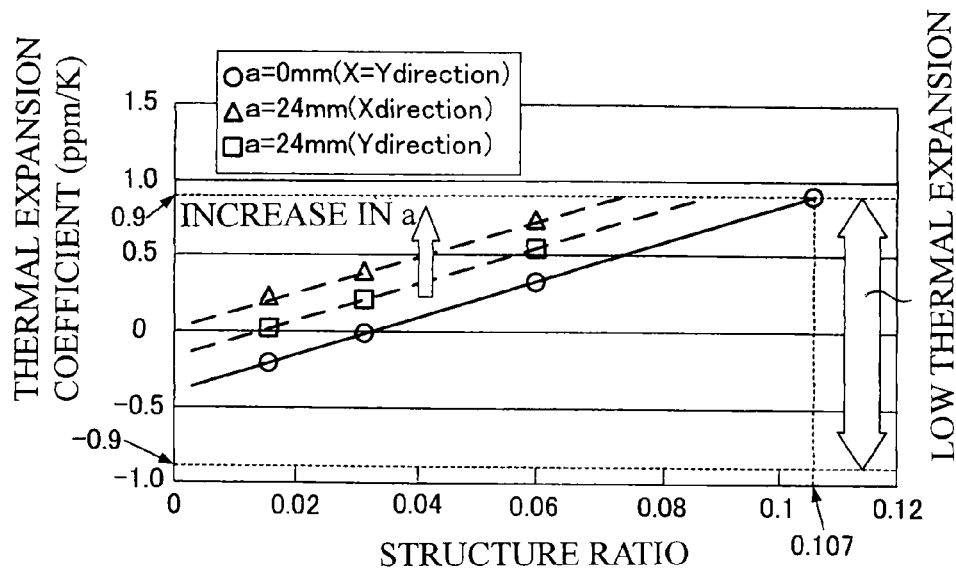
FIG. 7 is a graph illustrating dependence of the thermal expansion coefficient with respect to a structure ratio by using a distance between crossing regions as a parameter.

FIG. 7 is a graph illustrating the thermal expansion coefficients with the structure ratio being plotted on a horizontal axis.

Figure 8:
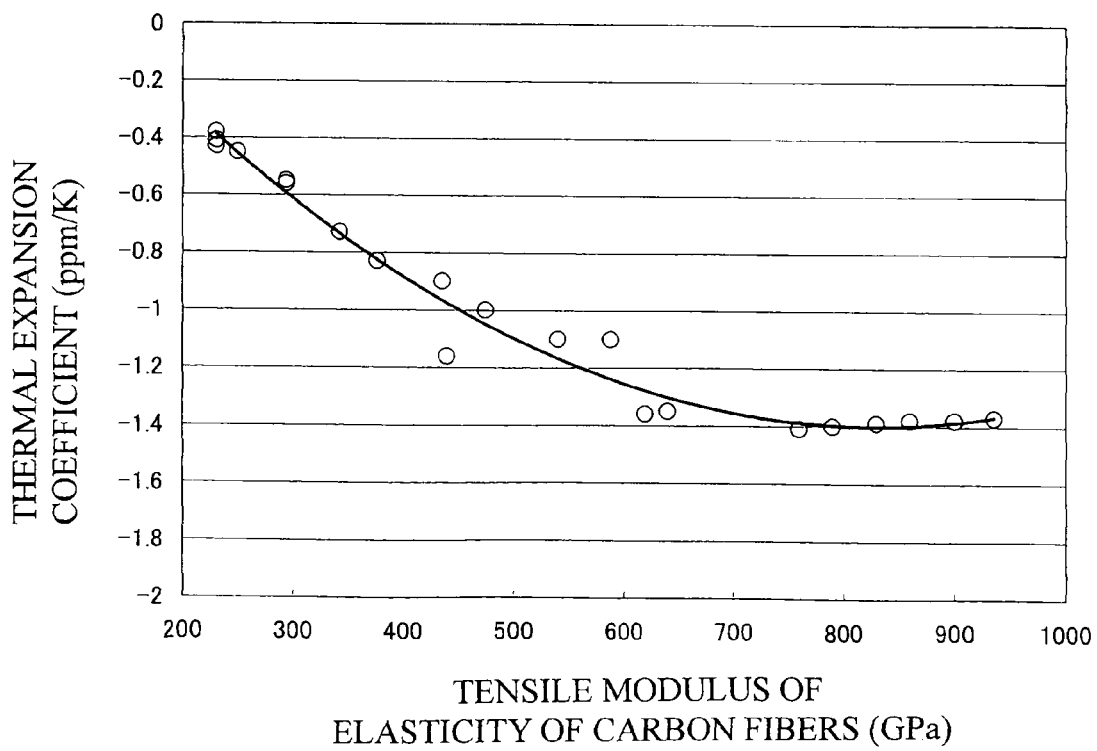
FIG. 8 is a graph illustrating dependence of the thermal expansion coefficient of carbon fibers with respect to tensile modulus of elasticity of the carbon fibers.

Next, there is defined a range of the carbon fibers, in which it is assumed that the advanced grid structure has high strength as a small satellite structure. In general, carbon fibers include carbon fibers having high strength and carbon fibers having high elasticity. However, when the conventional pseudoisotropic laminated structure is manufactured by using the carbon fibers of high elasticity, the thermal expansion coefficient can be made close to zero. This is because the carbon fiber reinforced plastic has a negative thermal expansion coefficient in a direction of the carbon fibers and has a positive thermal expansion coefficient in a direction perpendicular to the carbon fibers. Accordingly, by combining those, the thermal expansion coefficient becomes close to zero. However, in the case of the carbon fibers of high strength, in general, a tensile strength and a tensile modulus of elasticity of the carbon fibers have an inverse proportional relationship. Accordingly, the tensile modulus of elasticity becomes lower and the thermal expansion coefficient of the carbon fibers themselves becomes closer to zero. Therefore, in the pseudoisotropic laminated structure, the thermal expansion coefficient cannot be made close to zero. FIG. 8 is a graph illustrating a relationship between the tensile modulus of elasticity and the thermal expansion coefficient of the carbon fibers.

In contrast, in the advanced grid structure including a one-direction laminated structure of the carbon fibers and a structure close to the pseudoisotropic laminated structure, by adjusting the structure ratio and the distance between the crossing regions of the grid sides, the thermal expansion coefficient can be made zero even with the use of the carbon fibers of high strength.

Accordingly, the carbon fibers are assumed to be a reference of determination, whose thermal expansion coefficient cannot be made close to zero in the conventional pseudoisotropic laminated structure, but can be made zero in the advanced grid structure. With reference to a tensile modulus of elasticity of those carbon fibers, the tensile modulus of elasticity is defined to be 330 GPa or less.

Further, of the carbon fibers of high strength, there exist carbon fibers having a tensile strength smaller than that of the above-mentioned carbon fibers used as the reference of determination. Those carbon fibers have to be eliminated from the range of high strength. The above-mentioned carbon fibers have a tensile strength of about 4600 MPa. With reference to a tensile modulus of elasticity of those carbon fibers, the tensile modulus of elasticity is defined to be 280 GPa or less.

The above descriptions are summed up as follows. That is, the range of the carbon fibers having high strength in the advanced grid structure include the carbon fibers having the tensile modulus of elasticity of 280 GPa or more and 330 GPa or less.

Next, there is defined a range of the carbon fibers in which it is assumed that the advanced grid structure has low thermal expansion as a small satellite structure. In this case, a thermal expansion coefficient is taken as a reference of determination, which is obtained by using TORAYCA (registered trademark) carbon fibers T1000G having highest strength at present and which cannot be obtained in the conventional pseudoisotropic laminated structure. In this case, the thermal expansion coefficient of the pseudoisotropic laminated structure is 0.93 ppm/K, so a range of a body structure of the advanced grid structure which exhibits low thermal expansion includes a body structure having a thermal expansion coefficient of −0.9 ppm/K or more and 0.9 ppm/K or less.

The advanced grid structure according to the first embodiment of the present invention includes the three grid side groups each of which is formed by arranging at equal intervals the grid sides in which the carbon fibers are oriented in one direction. Of the three grid side groups, the first grid side group is used as a reference, the remaining second grid side group and third grid side group are inclined at 60 degrees clockwise and counterclockwise, respectively, and the first grid side group, the second grid side group, and the third grid side group cross each other. Accordingly, the advanced grid structure includes portions where the carbon fibers are laminated only in one direction and where the grid side groups do not cross each other, and crossing region portions where the grid side groups cross each other.

In this case, there is established a structure in which the crossing region portions of the grid side groups have characteristics as that of the pseudoisotropic laminated structure. Accordingly, a ratio between the crossing region portions and the one-direction laminated portions of the grid structure is adjusted by adjusting the structure ratios. Further, as the ratio of the equilateral-triangular grids in the grid structure increases, the characteristics of the grid structure become closer to the characteristics of the pseudoisotropic laminated structure. Accordingly, by adjusting the ratio between the equilateral-triangular grids and the hexagonal grids included in the grid structure by adjusting the distances between the crossing regions, high strength and low thermal expansion characteristics can be imparted.

FIG. 7 is a graph illustrating dependence of the thermal expansion coefficient with respect to the structure ratio with the distance between the crossing regions being used as a parameter.

FIG. 7 illustrates that, in the case where the carbon fibers having a tensile modulus of elasticity of 280 GPa or more and 330 GPa or less are used and the width W of the grid side or the distance L between the joint points 9 is adjusted such that the structure ratio is larger than 0 and 0.107 or less, it is possible to obtain the advanced grid structure having the thermal expansion coefficient of −0.9 ppm/K or more and 0.9 ppm/K or less.

Note that, in the advanced grid structure according to the first embodiment of the present invention, there are used prepregs formed by impregnating an epoxy resin into the TORAYCA (registered trademark) carbon fibers T800HB manufactured by Toray Industries Inc. having the tensile modulus of elasticity of 280 GPa or more and 330 GPa or less and by semi-curing the resultant. However, a resin is not limited to the epoxy resin, and any resin can be applied to the present invention as long as the resin has thermal mechanical chemical properties of resistance in use environment.

Second Embodiment

An advanced grid structure according to a second embodiment of the present invention includes carbon fibers different from those of the advanced grid structure according to the first embodiment of the present invention. Accordingly, structure ratios of the advanced grid structure according to the second embodiment are different from that of the first embodiment, but other details are the same. Therefore, the same components are denoted by the same reference symbols and a description thereof is omitted.

The carbon fibers used for the advanced grid structure according to the second embodiment of the present invention have the tensile modulus of elasticity of 280 GPa or more and 330 GPa or less.

Next, the tape prepregs were prepared such that the distances L between the joint points 9 were different from each other, and the advanced grid structure was manufactured thereby. In this case, the structure ratios were 0.015, 0.030, 0.060, and 0.107. The distances a between the crossing regions were 0 mm and 24 mm. The thermal expansion coefficient of the advanced grid structure was measured as illustrated in FIG. 6.

Figure 9:
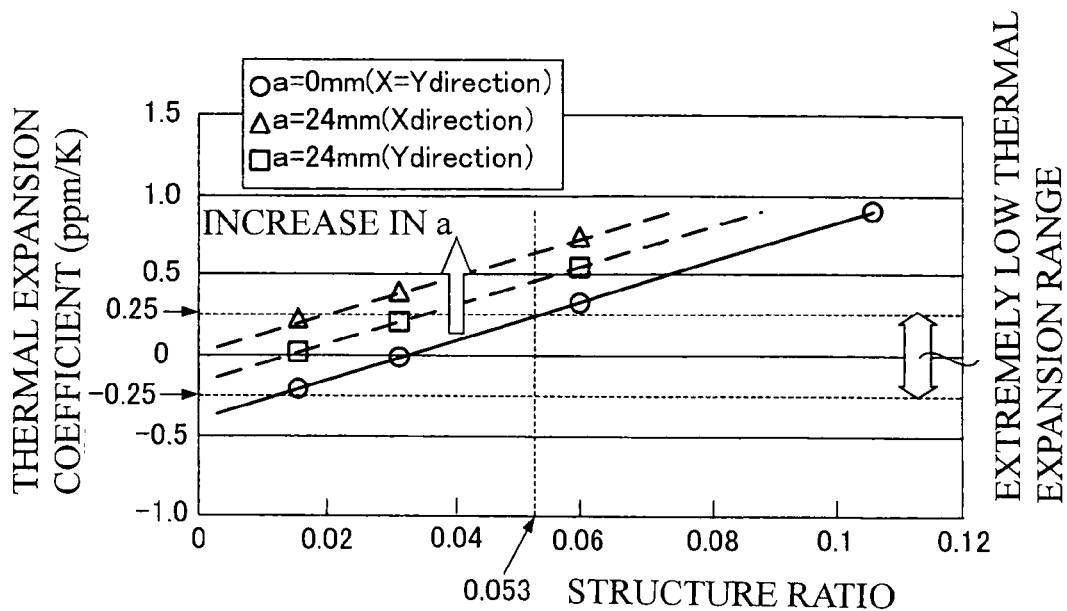
FIG. 9 is a graph illustrating dependence of a thermal expansion coefficient with respect to a structure ratio of an advanced grid structure according to a second embodiment of the present invention.

FIG. 9 is a graph illustrating dependence of the thermal expansion coefficient with respect to the structure ratio with the distance between the crossing regions being used as a parameter.

Next, there is defined a range of the carbon fibers in which it is assumed that the advanced grid structure has extremely low thermal expansion. In this case, a minimum thermal expansion coefficient is used as a reference of determination, which is obtained when the carbon fibers contained at present are used to form the conventional pseudoisotropic laminated structure. When the pseudoisotropic laminated structure is formed by using TORAYCA (registered trademark) carbon fibers M60J manufactured by Toray Industries Inc., a thermal expansion coefficient can be made −0.25 ppm/K. Accordingly, a range of a body structure of the advanced grid structure which exhibits extremely low thermal expansion includes a body structure having a thermal expansion coefficient of −0.25 ppm/K or more and 0.25 ppm/K or less.

FIG. 9 illustrates that, by adjusting the width W of the grid side or the distances L between the joint points 9 and the distances a between the crossing regions such that the structure ratios are larger than 0 and 0.053 or less, it is possible to obtain the advanced grid structure having the thermal expansion coefficient of −0.25 ppm/K or more and 0.25 ppm/K or less.

On the other hand, one of three carbon fiber prepreg sheets in which the carbon fibers having the tensile modulus of elasticity of 280 GPa or more and 330 GPa or less are oriented in one direction is inclined counterclockwise at 60 degrees, another of the three carbon fiber prepreg sheets is inclined clockwise at 60 degrees, and the three carbon fiber prepreg sheets are laminated to be heated under pressure. As a result, the epoxy resin is cured. While this laminated body is pseudo-isotropic, a thermal expansion coefficient thereof is 1.1 ppm/K or more.

In the advanced grid structure according to the second embodiment of the present invention, similarly to the advanced grid structure according to the first embodiment of the present invention, by adjusting the ratio between the crossing region portions of the grid sides and the one-direction laminated portions where the grid sides do not cross each other in the advanced grid structure and the distances between the crossing regions of the grid sides, the thermal expansion coefficient of the advanced grid structure can be made smaller.

Further, since the carbon fibers having the tensile modulus of elasticity of 280 GPa or more and 330 GPa or less are used and the width W of the grid side or the distances L between the joint points 9 and the distances a between the crossing regions are set such that the structure ratios are larger than 0 and 0.053 or less, it is possible to obtain the advanced grid structure having the thermal expansion coefficient of −0.25 ppm/K or more and 0.25 ppm/K or less.

Third Embodiment

An advanced grid structure according to a third embodiment of the present invention includes carbon fibers different from those of the advanced grid structure according to the first embodiment of the present invention. Accordingly, structure ratios of the advanced grid structure according to the third embodiment is different from that of the first embodiment, but other details are the same. Therefore, the same components are denoted by the same reference symbols and a description thereof is omitted.

The carbon fibers used for the advanced grid structure according to the third embodiment of the present invention have the tensile modulus of elasticity of 280 GPa or more and 330 GPa or less.

Next, the tape prepregs were prepared such that the distances L between the joint points 9 were different from each other, and the advanced grid structure was manufactured thereby. In this case, the structure ratios were 0.015, 0.030, 0.060, and 0.107. The distances a between the crossing regions were 0 mm and 24 mm. The thermal expansion coefficient of the advanced grid structure was measured as illustrated in FIG. 6.

Figure 10:
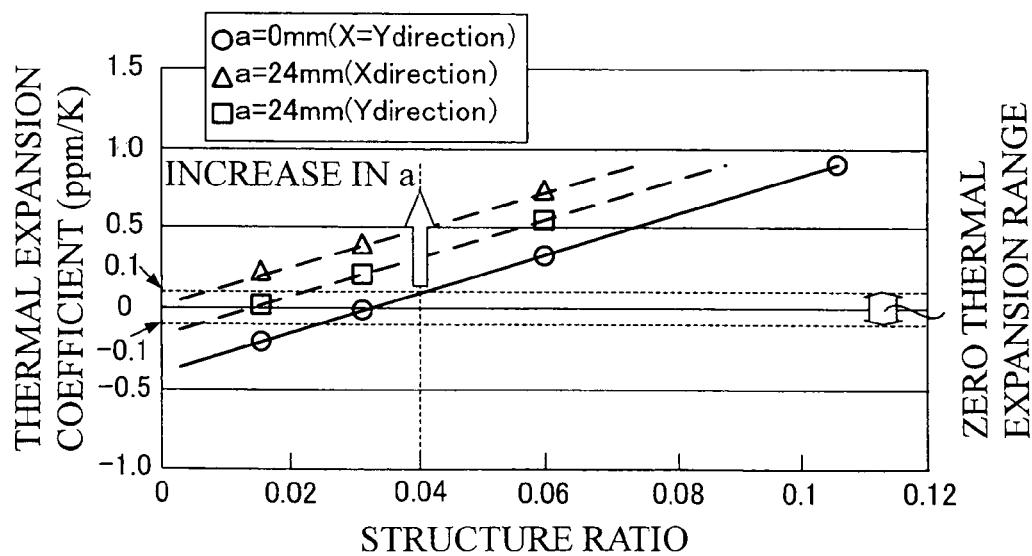
FIG. 10 is a graph illustrating dependence of a thermal expansion coefficient with respect to a structure ratio of an advanced grid structure according to a third embodiment of the present invention.

FIG. 10 is a graph illustrating dependence of the thermal expansion coefficient with respect to the structure ratio with the distance between the crossing regions being used as a parameter.

Next, there is defined a range of the carbon fibers in which it is assumed that the advanced grid structure has zero low-thermal expansion. In this case, a state where an absolute value of the thermal expansion coefficient is 0.10 ppm/K or lower is defined as zero thermal expansion. Accordingly, a range of a body structure of the advanced grid structure which exhibits the zero low-thermal expansion includes a body structure having the thermal expansion coefficient of −0.10 ppm/K or more and 0.10 ppm/K or less.

FIG. 10 illustrates that, by adjusting the width W of the grid side or the distances L between the joint points 9 and the distances a between the crossing regions such that the structure ratios are larger than 0 and 0.040 or less, it is possible to obtain the advanced grid structure having the thermal expansion coefficient of −0.10 ppm/K or more and 0.10 ppm/K or less.

On the other hand, one of three carbon fiber prepreg sheets in which the carbon fibers having the tensile modulus of elasticity of 280 GPa or more and 330 GPa or less are oriented in one direction is inclined counterclockwise at 60 degrees, another of the three carbon fiber prepreg sheets is inclined clockwise at 60 degrees, and the three carbon fiber prepreg sheets are laminated to be heated under pressure. As a result, the epoxy resin is cured. While this laminated body is pseudo-isotropic, a thermal expansion coefficient thereof is 1.1 ppm/K or more.

In the advanced grid structure according to the third embodiment of the present invention, similarly to the advanced grid structure according to the first embodiment of the present invention, by adjusting the ratio between the crossing region portions of the grid sides and the one-direction laminated portions where the grid sides do not cross each other in the advanced grid structure and the distances between the crossing regions of the grid sides, the thermal expansion coefficient of the advanced grid structure can be made smaller.

Further, since the carbon fibers having the tensile modulus of elasticity of 280 GPa or more and 330 GPa or less are used and the width W of the grid side or the distances L between the joint points 9 and the distances a between the crossing regions can be set such that the structure ratios are larger than 0 and 0.040 or less, it is possible to obtain the advanced grid structure having the thermal expansion coefficient of −0.10 ppm/K or more and 0.10 ppm/K or less.

Fourth Embodiment

Figure 11:
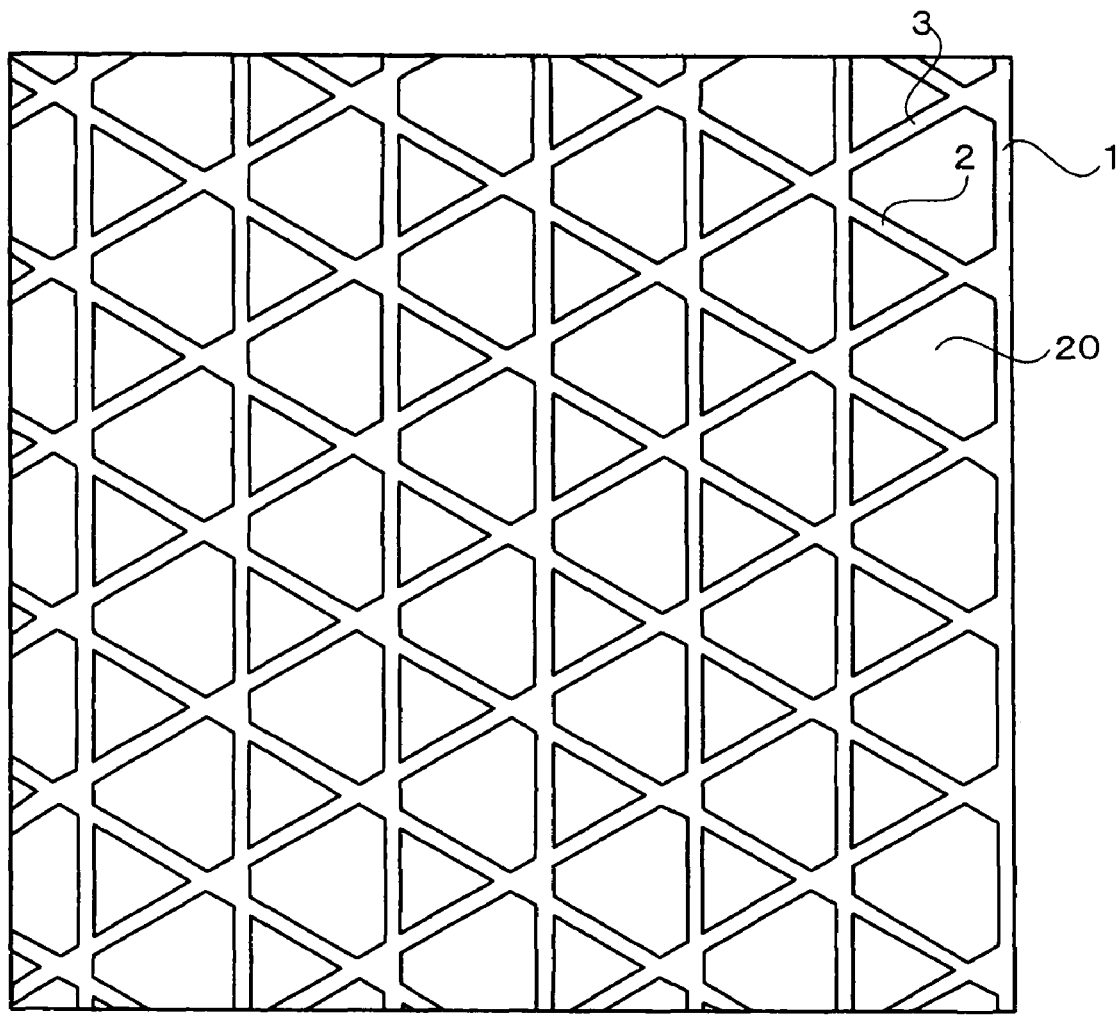
FIG. 11 is a front view of an advanced grid structure according to a fourth embodiment of the present invention.

FIG. 11 is a front view of an advanced grid structure according to a fourth embodiment of the present invention.

The advanced grid structure according to the fourth embodiment of the present invention is formed by, as illustrated in FIG. 11, integrating a pseudoisotropic carbon fiber reinforced epoxy resin plate 20 with the advanced grid structure according to the first embodiment of the present invention.

Next, a description is made of a step of integrating the pseudoisotropic carbon fiber reinforced epoxy resin plate with the advanced grid structure according to the first embodiment of the present invention.

Figure 12:
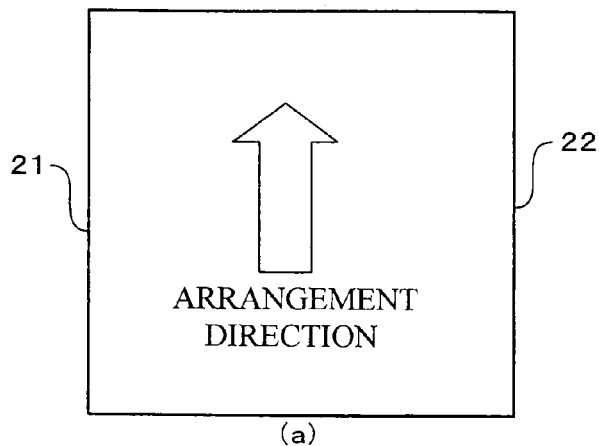
FIG. 12 are plan views of carbon fiber prepreg sheets of three types for manufacturing the advanced grid structure according to the fourth embodiment of the present invention.
Figure 12:
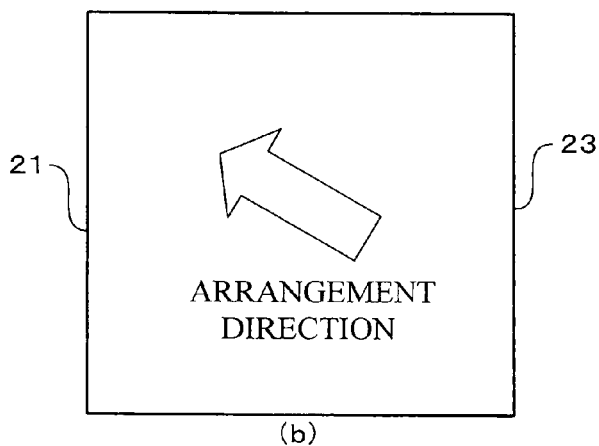
Figure 12:
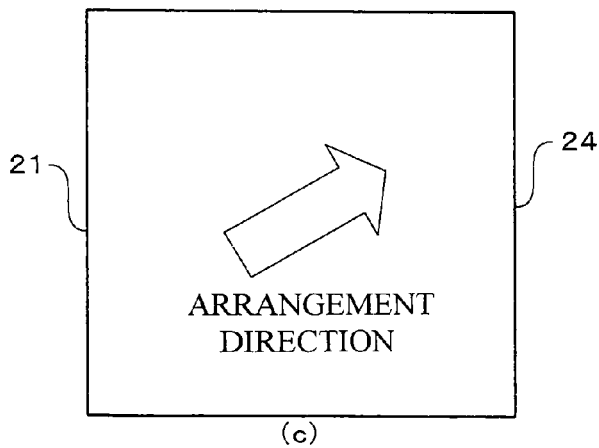

FIG. 12 are plan views of one-direction carbon fiber prepreg sheets of three types for manufacturing the advanced grid structure according to the fourth embodiment of the present invention.

The carbon fiber prepreg sheets of three types in each of which carbon fibers and a resin are selected so as to be equivalent in thermal expansion coefficient to the grid group include a 0-degree direction carbon fiber prepreg sheet 22 in which the carbon fibers are oriented in a direction parallel to a reference side 21 as illustrated in FIG. 12A, a +60-degree direction carbon fiber prepreg sheet 23 in which the carbon fibers are oriented in a direction inclined counterclockwise at 60 degrees with respect to the reference side 21 as illustrated in FIG. 12B, and a −60-degree direction carbon fiber prepreg sheet 24 in which the carbon fibers are oriented in a direction inclined clockwise at 60 degrees with respect to the reference side 21 as illustrated in FIG. 12C.

The carbon fiber prepreg sheets of three types are laminated, the advanced grid structure according to the first embodiment of the present invention is placed thereon, and the resultant is heated under pressure, thereby manufacturing the advanced grid structure according to the fourth embodiment of the present invention illustrated in FIG. 8.

In the advanced grid structure according to the fourth embodiment of the present invention, similarly to the advanced grid structure according to the first embodiment of the present invention, by adjusting the ratio between the crossing region portions of the grid sides and the portions where the grid sides do not cross each other in the advanced grid structure and the distance between the crossing regions of the grid sides, the thermal expansion coefficient of the advanced grid structure can be made smaller.

Further, since the pseudoisotropic carbon fiber reinforced epoxy resin plate 20 is disposed on one surface of the advanced grid structure, an area as the advanced grid structure becomes larger. Accordingly, connection to other parts and mounting of devices are facilitated.

Note that, in the advanced grid structures according to the first to fourth embodiments of the present invention, the carbon fibers of two types are used, but the carbon fibers are not limited to those. With the use of carbon fibers capable of satisfying a desired strength, by adjusting a ratio between portions having a high thermal expansion coefficient and portions having a low thermal expansion coefficient, it is possible to obtain an advanced grid structure having low thermal expansion characteristics.

What is claimed is:

1. An advanced grid structure, comprising:
a first tape prepreg group including a plurality of first tape prepregs, each first tape prepreg including first carbon fibers that are aligned in a first direction and that form first grid sides, a plurality of the first grid sides being spaced apart from one another at equal intervals and being aligned in the first direction;
a second tape prepreg group including a plurality of second tape prepregs, each second tape prepreg including second carbon fibers that are aligned in a second direction inclined counterclockwise at 60 degrees with respect to the first direction and that form second grid sides, a plurality of the second grid sides being spaced apart from one another at equal intervals and being aligned in the second direction;
a third tape prepreg group including a plurality of third tape prepregs, each third tape prepreg including third carbon fibers that are aligned, in a third direction inclined clockwise at 60 degrees with respect to the first direction and that form third grid sides, a plurality of the third grid sides being spaced apart from one another at equal intervals and being aligned in the second direction, the first tape prepreg group, the second tape prepreg group, and the third tape prepreg group being laminated repetitively in the stated order so that two of the first tape prepreg group, the second tape prepreg group, and the third tape prepreg group overlap on top of each other, and being heated under pressure, to form the advanced grid structure;
a first grid side group formed of the plurality of the first grid sides;
a second grid side group formed of the plurality of the second grid sides; and
a third grid side group formed of the plurality of the third grid sides, wherein
a structure ratio of the advanced grid structure is larger than 0 and 0.107 or less, the structure ratio being obtained by dividing a width of one of the first, second, or third grid sides, by, a distance between a center point of a first region where the second grid side group and the third grid side group cross each other and a center point of a second region where the second grid side group and the third grid side group cross each other, the first and second regions being two regions in a single plane closest to one another,
a thermal expansion coefficient of the advanced grid structure is −0.9 ppm/K or more and 0.9 ppm/K or less, and
the first, second, and third carbon fibers have a tensile modulus of elasticity of 280 GPa or more and 330 GPa or less.

2. An advanced grid structure, comprising:
a first tape prepreg group including a plurality of first tape prepregs, each first tape prepreg including first carbon fibers that are aligned in a first direction and that form first grid sides, a plurality of the first grid sides being spaced apart from one another at equal intervals and being aligned in the first direction;
a second tape prepreg group including a plurality of second tape prepregs, each second tape prepreg including second carbon fibers that are aligned in a second direction inclined counterclockwise at 60 degrees with respect to the first direction and that form second grid sides, a plurality of the second grid sides being spaced apart from one another at equal intervals and being aligned in the second direction;
a third tape prepreg group including a plurality of third tape prepregs, each third tape prepreg including third carbon fibers that are aligned in a third direction inclined clockwise at 60 degrees with respect to the first direction and that form third grid sides, a plurality of the third grid sides being spaced apart from one another at equal intervals and being aligned in the second direction, the first tape prepreg group, the second tape prepreg group, and the third tape prepreg group being laminated repetitively in the stated order so that two of the first tape prepreg group, the second tape prepreg group, and the third tape prepreg group overlap on top of each other, and being heated under pressure, to form the advanced grid structure;
a first grid side group formed of the plurality of the first grid sides;
a second grid side group formed of the plurality of the second grid sides; and
a third grid side group formed of the plurality of the third grid sides, wherein
a structure ratio of the advanced grid structure is larger than 0 and 0.053 or less, the structure ratio being obtained by dividing a width of one of the first, second, or third grid sides, by, a distance between a center point of a first region where the second grid side group and the third grid side group cross each other and a center point of a second region where the second grid side group and the third grid side group cross each other, the first and second regions being two regions in a single plane closest to one another, and the first, second, and third carbon fibers have a tensile modulus of elasticity of 280 GPa or more and 330 GPa or less.

3. An advanced grid structure, comprising:

a first tape prepreg group including a plurality of first tape prepregs, each first tape prepreg including first carbon fibers that are aligned in a first direction and that form first grid sides, a plurality of the first grid sides being spaced apart from one another at equal intervals and being aligned in the first direction;

a second tape prepreg group including a plurality of second tape prepregs, each second tape prepreg including second carbon fibers that are aligned in a second direction inclined counterclockwise at 60 degrees with respect to the first direction and that form second grid sides, a plurality of the second grid sides being spaced apart from one another at equal intervals and being aligned in the second direction;

a third tape prepreg group including a plurality of third tape prepregs, each third tape prepreg including third carbon fibers that are aligned in a third direction inclined clockwise at 60 degrees with respect to the first direction and that form third grid sides, a plurality of the third grid sides being spaced apart from one another at equal intervals and being aligned in the second direction, the first tape prepreg group, the second tape prepreg group, and the third tape prepreg group being laminated repetitively in the stated order so that two of the first tape prepreg group, the second tape prepreg group, and the third tape prepreg group overlap on top of each other, and being heated under pressure, to form the advanced grid structure;

a first grid side group formed of the plurality of the first grid sides;

a second grid side group formed of the plurality of the second grid sides; and a third grid side group formed of the plurality of the third grid sides, wherein a structure ratio of the advanced grid structure is larger than 0 and 0.040 or less, the structure ratio being obtained by dividing a width of one of the first, second, or third grid sides, by, a distance between a center point of a first region where the second grid side group and the third grid side group cross each other and a center point of a second region where the second grid side group and the third grid side group cross each other, the first and second regions being two regions in a single plane closest to one another, and the first, second, and third carbon fibers have a tensile modulus of elasticity of 280 GPa or more and 330 GPa or less.

4. The advanced grid structure according to claim 3 wherein the thermal expansion coefficient of the advanced grid structure is −0.10 ppm/K or more and 0.10 ppm/K or less.

5. The advanced grid structure according to claim 2 wherein the thermal expansion coefficient of the advanced grid structure is −0.25 ppm/K or more and 0.25 ppm/K or less.

6. An advanced grid structure according to any one of claims 1-3, 5, and 4, further comprising:

a laminated plate in which the first, second, and third carbon fibers are oriented and laminated.

* * * * *